(12) United States Patent
Delker et al.

(10) Patent No.: US 7,812,854 B1
(45) Date of Patent: Oct. 12, 2010

(54) DIGITAL RIGHTS MANAGEMENT FOR MOBILE DEVICES

(75) Inventors: Jason R. Delker, Olathe, KS (US); John M. Everson, Leawood, KS (US); Jarrod A. Nichols, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1068 days.

(21) Appl. No.: 11/515,567

(22) Filed: Sep. 5, 2006

(51) Int. Cl.
*H04N 7/14* (2006.01)
*G06F 15/16* (2006.01)

(52) U.S. Cl. .............. 348/14.01; 348/14.02; 348/14.03; 455/414.1

(58) Field of Classification Search ... 348/14.01–14.16; 455/414.1, 414.2, 414.3; 700/94; 709/231; 381/61; 370/352
See application file for complete search history.

(56) References Cited

U.S. PATENT DOCUMENTS

| 2002/0002413 | A1* | 1/2002 | Tokue ........................ 700/94 |
| 2004/0172561 | A1 | 9/2004 | Iga |
| 2004/0176080 | A1 | 9/2004 | Chakravorty et al. |
| 2005/0004875 | A1 | 1/2005 | Kontio et al. |
| 2005/0070248 | A1 | 3/2005 | Gaur |
| 2006/0200577 | A1* | 9/2006 | Park .......................... 709/231 |
| 2007/0077921 | A1* | 4/2007 | Hayashi et al. .......... 455/414.1 |

FOREIGN PATENT DOCUMENTS

GB  2 403 382 A  12/2004

OTHER PUBLICATIONS http://www.windowsfordevices.com/news/NS7602021719.html, Jan. 6, 2005.
"Setting Up TiVoToGo," http://www.tivo.com/4.9.19.setup.asp, printed from World Wide Web on Apr. 6, 2006.
"TiVoToGo Transfers," http://www.tivo.com/4.9.19.asp.
Robert Heron "TiVoToGo," http://www.pcmag.com/article2/0,1895,1913651,00.asp, Jan. 11, 2006.
"Orb DVR everywhere," http://www.orb.com/dvreverywhere.
"Orb DVR Everywhere—Orb Community Forum Index," user posts, Aug. 26, 2005 to Nov. 13, 2005.
"ARS Technica: Sprint Nextel to launch cell phone movie service," http://arstechnica.com/news.ars/post/200512125741.html, Dec. 12, 2005.
"Sprint PCS Vision Smart Device: PPC-6700."

* cited by examiner

*Primary Examiner*—Melur Ramakrishnaiah (57) ABSTRACT

Methods and systems are provided for digital rights management for mobile devices. An account is maintained for a subscriber. The account is associated with a mobile video player (MVP) and a digital video recorder (DVR). The MVP is served by a wireless carrier, and the DVR is connected to a packet-data network. A first content request is received from the MVP. The first content request identifies requested content and includes an identifier of the MVP that was added to the first content request by the wireless carrier to verify that the MVP sent the first content request. The identifier of the MVP is used to identify the account. A second content request, which identifies the requested content, is sent to the DVR. The requested content is received from the DVR, and then sent to the MVP via the wireless carrier, for receipt and playing by the MVP for the subscriber.

20 Claims, 2 Drawing Sheets

DIGITAL RIGHTS MANAGEMENT FOR MOBILE DEVICES

BACKGROUND

1. Technical Field

The present invention relates to wireless communications, and more particularly, to providing digital rights management for content downloaded to wireless communication devices.

2. Description of Related Art

More people than ever are using mobile stations, such as cell phones and personal digital assistants (PDAs), to connect to wireless networks, which are also referred to as wireless wide area networks (WWANs), cellular communication systems, radio access networks (RANs), wireless access networks, and by other names. Wireless carriers typically operate these networks to provide both voice and data services using a wireless communication format such as Code Division Multiple Access (CDMA), Evolution Data Optimized (EV-DO), or another format.

Among the data services in which a mobile station may engage is the downloading and playing of multimedia content, such as video and/or audio. As examples, a mobile station may download and play a ringtone or a song. As further examples, a mobile station may download and play a video clip, perhaps involving sports highlights, a snippet of a movie, or perhaps even an entire movie or episode of a television show. Mobile stations having these capabilities may be referred to herein as mobile video players (MVPs) though, as stated, these MVPs can play more than just video. Often this content will be copyrighted, in which case it is important for wireless carriers and other entities to ensure that copyrights and any other applicable rights are respected. In general, this concern is referred to as digital rights management (DRM).

In addition to mobile stations, another type of device that has recently grown in popularity is a known as a digital video recorder (DVR). A DVR is a device that typically connects to both a media input—such as a cable line or satellite dish—and also to a viewing-device output such as a television. DVRs typically include an interface for a remote control, as well as some type of data storage, such as a hard disk. A typical DVR will continuously record an approximately 30-minute-long cache of whatever a user is currently watching, so that the user can rewind and pause live television, among other VCR-like functions. DVRs also are typically able to be programmed to record television shows and movies for later playback, based on program-guide information that is downloaded and stored by the DVR.

To enable downloading and storing of program-guide and other information, as well as other communication, DVRs are often network-connected, having an IP address, perhaps on the global Internet, or perhaps on a user's private IP network, behind a publicly-addressed device such as a cable modem or Digital Subscriber Line (DSL) modem. For example, a DVR may have a WiFi (IEEE 802.11) connection with a wireless access point, which in turn is connected to a cable modem. In other examples, a DVR may engage in IP communication using the same communication path over which the DVR receives the underlying television signal. This path could involve a hybrid fiber/coaxial network, or perhaps a satellite dish and a satellite.

Furthermore, a user may have more than one DVR set up in his or her home or office, where each DVR has its own IP address, which again could be on the global Internet or on the user's private IP network. Each DVR may have different pieces of content—such as different television shows, movies, songs, etc. —stored thereon, and, in some examples, certain pieces of content may be distributed across the multiple DVRs. And other arrangements are possible.

SUMMARY

Methods and systems are provided for digital rights management for mobile devices. In particular, methods and systems are provided to facilitate the downloading of content from a user's DVR to that user's MVP. Thus, an exemplary embodiment of the present invention may take the form of a method, which could be carried out by one or more network servers. In accordance with the method, an account is maintained for a subscriber. The account is associated with an MVP and a DVR. The MVP is served by a wireless carrier, and the DVR is connected to a packet-data network.

Further in accordance with the exemplary embodiment, a first content request is received from the MVP via the wireless carrier. The first content request identifies requested content and includes an identifier of the MVP, which was added to the first content request by the wireless carrier to verify that the MVP sent the first content request. The identifier of the MVP is used to identify the account. A second content request is then sent to the DVR over the packet-data network, identifying the requested content. The requested content is received from the DVR over the packet-data network, and then sent to the MVP via the wireless carrier, for receipt and playing by the MVP for the subscriber.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Overview

In accordance with exemplary embodiments of the present invention, a user may subscribe to wireless service from a wireless carrier. In accordance with that subscription, the user may operate a mobile station, such as a cell phone or PDA. This mobile station may also have the capability to play downloaded content for the enjoyment of the user. This content may include audio and/or video content, as well as one or more other types of content. In the balance of this description, video content will be used as an example. As stated above, this mobile station may be referred to as an MVP.

In addition to having the aforementioned MVP, the user may also have a DVR (or multiple DVRs) that the user uses at his or her home, for example. As presently contemplated, the present invention provides a mechanism to facilitate delivery of, e.g., video content from the user's DVR to the user's MVP, where the user's DVR has a packet-data connection with a network such as the Internet, and where the user's MVP is served by the wireless carrier. To facilitate operation of the present invention, a network server referred to herein as an MVP server is provided, having connectivity (directly or indirectly) with the same packet-data network, and operated by the wireless carrier or perhaps by a third party.

As an initial step, in exemplary embodiments, the user will establish an account with the MVP server. The user may do so by logging in to the MVP server over a world-wide-web interface, over the phone, in person at a service center, in some other manner, or perhaps utilizing a combination of these options. As a result of this account establishment, the MVP server will thereby have a profile record for the user, which the MVP server will later use, perhaps among other purposes, to validate a requested content transfer.

Next, the user's MVP-server account may be provisioned with an identifier of the user's MVP ("MVP ID"). This may be carried out in various ways. In one implementation, if the MVP is provided by the wireless carrier and the user carries out the above-described MVP-account establishment via the wireless carrier (e.g., in part by signing into an account the user may have on the wireless carrier's website), that MVP-server-account-establishment process could result in the MVP ID being recorded in the user's MVP-server account.

In another implementation, the user could visit an MVP-provisioning website (perhaps during the MVP-server-account-establishment process) from a personal computer, and could then enter their mobile phone number. The MVP-provisioning website (or associated system) could then responsively send a Wireless Application Protocol (WAP) Push, a Multimedia Message Service (MMS) message, or the like to the user's MVP, which would provide the MVP with a link to the MVP server. When the user invokes that link, the MVP would responsively send a request, such as a HyperText Transfer Protocol (HTTP) GET, perhaps constituting a registration message, to the MVP server. That request may then pass through the wireless carrier's web gateway (by virtue of coming from the MVP), which may add the MVP ID to the request. As additional possibilities, the MVP ID may be added to the request by another entity operated by the wireless carrier, such as a proxy, a firewall, a home agent, or any other suitable entity. And certainly other possibilities exist as well.

Note that the MVP ID need not be a single identifier, though it could be. The MVP ID could include any one or any combination of a Mobile Identification Number (MIN), Electronic Serial Number (ESN), Network Access Identifier (NAI), Session Initiation Protocol (SIP) address, IP address, Media Access Control (MAC) address, username, password, and any other identifier. Note as well that the wireless carrier may be particularly well situated to securely add the MVP ID to a request message for receipt by the MVP server, thereby reducing the risk of a user device successfully "spoofing" the MVP server with fake ID data.

Whatever the chosen mechanism for conveying the MVP ID to the MVP server is, the MVP server will receive the MVP ID and store it in the user's account as an indication that the user's MVP is authorized to receive content from the user's DVR. Further, the MVP server will send a reply message, such as an HTTP 200 OK message, to the user's MVP, indicating successful registration. Note that if the user does not have an existing account with the MVP server when the user attempts to register the MVP with the MVP server, an account could be set up for the user at that time, perhaps involving the MVP server prompting the user for approval to establish the account, and to tie the account to the user's wireless-service account for billing.

As part of the process of registering the MVP with the MVP server, the MVP server may provide the MVP with a decryption key, perhaps as part of the above-mentioned HTTP 200 OK message. This may enable secure transmission of content to the MVP. Whether the MVP receives this key from the MVP server or already has it stored, in a preferred embodiment, the MVP will use the decryption key to decrypt content it receives from the MVP server. The MVP server will encrypt content specifically for that MVP, i.e., corresponding to the decryption key stored by the MVP, so as to avoid having unauthorized devices be able to view the content.

As another possibility, encryption/decryption keys could be associated with the MVP in particular, but exchanged between the MVP server and an entity—such as a gateway or proxy—in the wireless carrier's network. And thus the encryption/decryption relationship would be between the MVP server and the gateway or proxy; even in that case, however, content would still be encrypted for playback by the MVP and not any other devices.

In addition to provisioning the user's MVP-server account with the MVP ID, the MVP-server account will also be provisioned with an identifier of the user's DVR ("DVR ID"). Again, the user could have more than one DVR, as one is used as an example. As with the provisioning of the MVP ID, the provisioning of the DVR ID can be done in various ways. If the DVR is provided by the same entity that provides the MVP server (which could be the wireless carrier), that entity could update the user's MVP-server account to include the DVR ID at the time the user gets the DVR. In another arrangement, the user could log into the MVP server from the DVR, and provision the DVR ID into the MVP-server account. Through that arrangement, the DVR would transmit its own DVR ID to the MVP server. And other possibilities exist as well.

And similar to the MVP ID, the DVR ID could include one or more unique identifiers for the user's DVR. In a preferred embodiment, the DVR ID would include a serial number, and it could also include an IP address, NAI, MAC address, a digital certificate, a device identity certificate, and/or any other unique identifier for the DVR. And the MVP-server account would preferably store the current IP address of the DVR, to facilitate IP communication with the DVR. Note that a transport-protocol port number may be stored in the MVP-server account as well, which may be used to distinguish among multiple IP nodes on a user's private IP network.

Whatever the chosen mechanism for conveying the DVR ID to the MVP server is, the MVP server will receive the DVR ID and store it in the user's account. Once the account has both the MVP ID and the DVR ID, the account will function to correlate the user's MVP with the user's DVR. Note that the user could provision more than one DVR into the user's MVP account, to facilitate transmission of content from more than one DVR to the user's MVP. And note that a user could operate more than one MVP in accordance with the present invention.

Furthermore, the MVP server will preferably include or have access to data that indicates the capabilities of various types of MVPs. For example, the data could indicate and/or dictate what codec(s) the MVP server should use when structuring DVR content for transmission to particular MVPs. One MVP, for instance, may only be able to play DVR content that has been encoded with a particular codec, while another MVP may only be able to play DVR content that has been encoded with a different codec. The MVP server may use the device-capabilities data to help determine which codec(s) to use, depending on which MVP is to receive the content.

In operation, to facilitate user selection of content to be transmitted from a DVR to an MVP, a listing of the available content on the DVR will be made available to the user at the MVP. This can be done in various ways. In a preferred arrangement, the DVR will regularly report its content catalog (e.g., upon each change in what the DVR is storing) to the MVP server, perhaps by sending an HTTP message (e.g., a PUSH) to the MVP server, containing the latest content listing. The MVP server would then store the listing (or reference thereto) in the user's account, in place of any pre-existing listing (or listing reference).

The user may then operate a browser or other content-downloading application on the MVP to interact with the MVP server and download the most current catalog listing from the user's MVP-server account, thus giving the user a listing of what content is stored on the user's DVR. The listing may be in the form of links to each piece of content, for convenience, with each link pointing to the MVP server. That way, the user could click on a desired link to request download of a particular piece of content from the DVR, and a request would responsively be sent to the MVP server. Note that the MVP server may also receive and update the DVR's IP address each time it receives a catalog update from the DVR.

As briefly described above, the user will direct the MVP to send to the MVP server a request for particular content from the DVR. The request may be an HTTP request message. In a preferred embodiment, the request will pass through the wireless carrier's gateway (or proxy, or any other suitable network entity), which will supplement the request with the MVP ID that is stored in the user's wireless-carrier account. (Again, the wireless carrier is well situated to do this securely, to avoid spoofing.) Thus, the MVP server will receive the request message from the MVP, including the added MVP ID.

In response, the MVP server will check the user's MVP-server account to validate the user's MVP, i.e., to ensure that the requesting MVP is entitled to receive content from an associated DVR. To validate the MVP, the MVP server may check to ensure that the MVP ID added by the wireless carrier matches that stored in the user's MVP-server account. Further, this validation process functions to allow the MVP server to determine which DVR will be the source of the requested content. Upon successful validation, the MVP server will then forward the request message, or a derivative thereof, to the DVR. Thus, the DVR will receive the request to provide particular content to the MVP server.

Upon receipt of the content request, the DVR will then send the requested content in a response message to the MVP server. Upon receipt of the content, the MVP server will transcode the content to a form suitable for play-out on the user's MVP, based on reference to the device-capabilities data noted above. This transcoding may, for example, involve the use of a particular codec with which the MVP is familiar. The MVP server will also encrypt the transcoded content in a way that allows decryption by just the user's MVP, as noted above. And the MVP server will then send the encrypted, transcoded content in a response to the user's MVP. The user's MVP may thus receive, decrypt, decode, and play out the content. As mentioned above, an entity—such as a gateway or proxy—on the wireless carrier's network could play a role in the decryption and/or decoding of the content on behalf of the MVP.

In one embodiment, the decryption keys could be stored in the network, and retrieved by the MVP (or other decrypting entity) each time the associated content is played. This would make it possible for the content to expire (i.e., become unplayable) after, as examples, a certain amount of time or number of viewings. Furthermore, per-use billing could be implemented. The carrier could automatically provide the correct key to the MVP based on a device identifier used to uniquely identify the MVP. In one embodiment, the user may be charged for each instance of DVR-to-MVP content transfer, or based on the quantity of data transferred. Further, the user could be charged fees that could be used to pay content providers, to facilitate payment for use of copyrighted content. And other billing arrangements are possible as well.

2. Exemplary Architecture a. Exemplary Communication System

Figure 1:
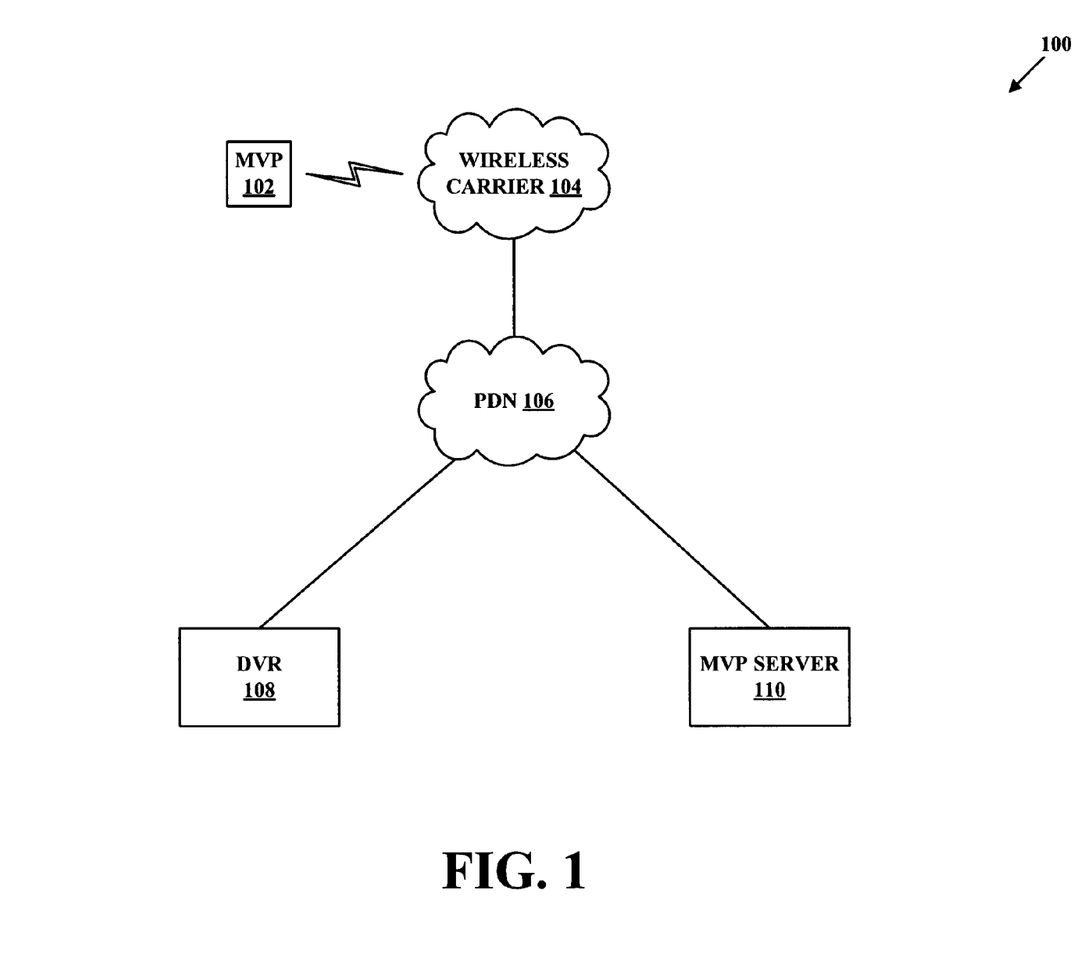
FIG. 1 is a simplified block diagram of a communication system that may be used in accordance with exemplary embodiments.

FIG. 1 is a simplified block diagram of a communication system that may be used in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an MVP 102, a wireless carrier 104, a packet-data network (PDN) 106, a DVR 108, and an MVP server 110. It should be understood that any number of network entities not shown in FIG. 1 could be present as well. For example, there could be any number of mobile stations and other devices in communication with wireless carrier 104 and PDN 106. Also, there could be any number of intermediate devices and networks making up all or part of any of the communication links. For example, there could be one or more routers or other devices on the link between PDN 106 and DVR 108.

MVP 102 may be any mobile device capable of communicating with wireless carrier 104, and of carrying out the MVP functions described herein. As examples, MVP 102 may be a cell phone, PDA, or laptop computer. MVP 102 may include a wireless-communication interface, which may include a chipset and antenna, and which MVP 102 may use to communicate with wireless carrier 104 over a radio-frequency (RF) air interface using a protocol such as CDMA, EV-DO, General Packet Radio Service (GPRS), Enhanced Data rates for Global Evolution (EDGE), Worldwide Interoperability for Microwave Access (WiMax) (i.e. IEEE 802.16), or any other suitable wireless communications protocol.

MVP 102 may include a user interface with which its user(s) could interact to input commands, view outputs, place and receive telephone calls, view and/or listen to audiovisual content, and/or take advantage of other functions provided by MVP 102. MVP 102 may further include a processor and data storage comprising instructions executable by the processor to carry out the various MVP functions described herein.

Wireless carrier 104 may include one or more base stations that may communicate with MVP 102, as well as one or more other mobile stations, using a protocol such as CDMA, EV-DO, any of the protocols mentioned herein, and/or any other wireless communication protocol. Each of these base stations may take the form of a device known as a base transceiver station (BTS) controlled by a device known as a base station controller (BSC). A BTS may also be called a Node-B, while a BSC may also be called a radio network controller (RNC). The BTS may comprise one or more antennas that radiate to define one or more wireless coverage areas, and may further comprise a communication interface for communicating with a BSC.

A BSC may control one or more BTSs, and may comprise one or more communication interfaces to facilitate communication with one or more BTSs, as well as with a device known as a packet data serving node (PDSN), which may act as a network access server, providing a packet-data connection between wireless carrier 104 and PDN 106. Thus, MVP 102 may engage in packet-data communication, such as IP communication, via wireless carrier 104 over PDN 106, over a communication path that includes a BTS, a BSC, and a PDSN. Note that the BSC may also be coupled with a device known as a mobile switching center (MSC), to facilitate MVP 102 engaging in voice calls over the Public Switched Telephone Network (PSTN).

And other network arrangements are possible as well, as wireless carrier 104 may include any network entities instead of or in addition to those mentioned herein. As examples, wireless carrier 104 may include any number of gateways, proxies, servers, databases, home location registers, visitor location registers, home agents, foreign agents, routers, switches, local area networks (LANs), wide area networks (WANs), wireless networks, and/or any number of other entities to facilitate carrying out the wireless-carrier functions described herein.

PDN 106 may be communicatively coupled with at least wireless carrier 104, DVR 108, and MVP server 110, and may include one or more WANs, one or more LANs, one or more public networks such as the Internet, one or more private networks, one or more wired networks, one or more wireless networks, and/or one or more networks of any other variety. Devices in communication with PDN 106 may exchange data using a packet-switched protocol such as the Internet Protocol (IP), and may be identified by an address such as an IP address.

DVR 108 may be any computing device arranged to carry out the DVR functions described herein. As such, DVR 108 may include a processor and data storage comprising instructions executable by the processor for carrying out those functions. DVR 108 may further comprise a user interface, which could include an infrared port for communicating with a remote control, as well as buttons, a display, and/or any other user-interface elements. DVR 108 may also include a communication interface such as a coaxial-cable port for receiving television signals over a communication path that may include a set-top box, a hybrid cable/fiber network, a satellite dish and satellite, a packet-data network, and/or any other type of device or network, as well as perhaps for engaging in one-way or two-way communication over that network.

DVR 108 may also include a separate communication interface for engaging in two-way packet-data communication, such as IP communication, over PDN 106. This communication over PDN 106 could be conducted, as an example, using a USB-to-Wi-Fi adapter to communicate with a Wi-Fi access point, which in turn communicates with a network access device, such as a cable modem, that resides on PDN 106. And other examples are possible as well, such as DVR 108 comprising an Ethernet interface to communicate with a router or network access device. Furthermore, DVR 108 may include an output port for sending content to a display such as a television.

MVP server 110 may be one or more network servers arranged to carry out the MVP-server functions described herein. As such, MVP server 110 may include a processor and data storage comprising instructions executable by the processor to carry out those functions. MVP server 110 may further include a communication interface, such as an Ethernet interface or a wireless-communication interface as examples, for communicating over PDN 106.

3. Exemplary Operation

Figure 2:
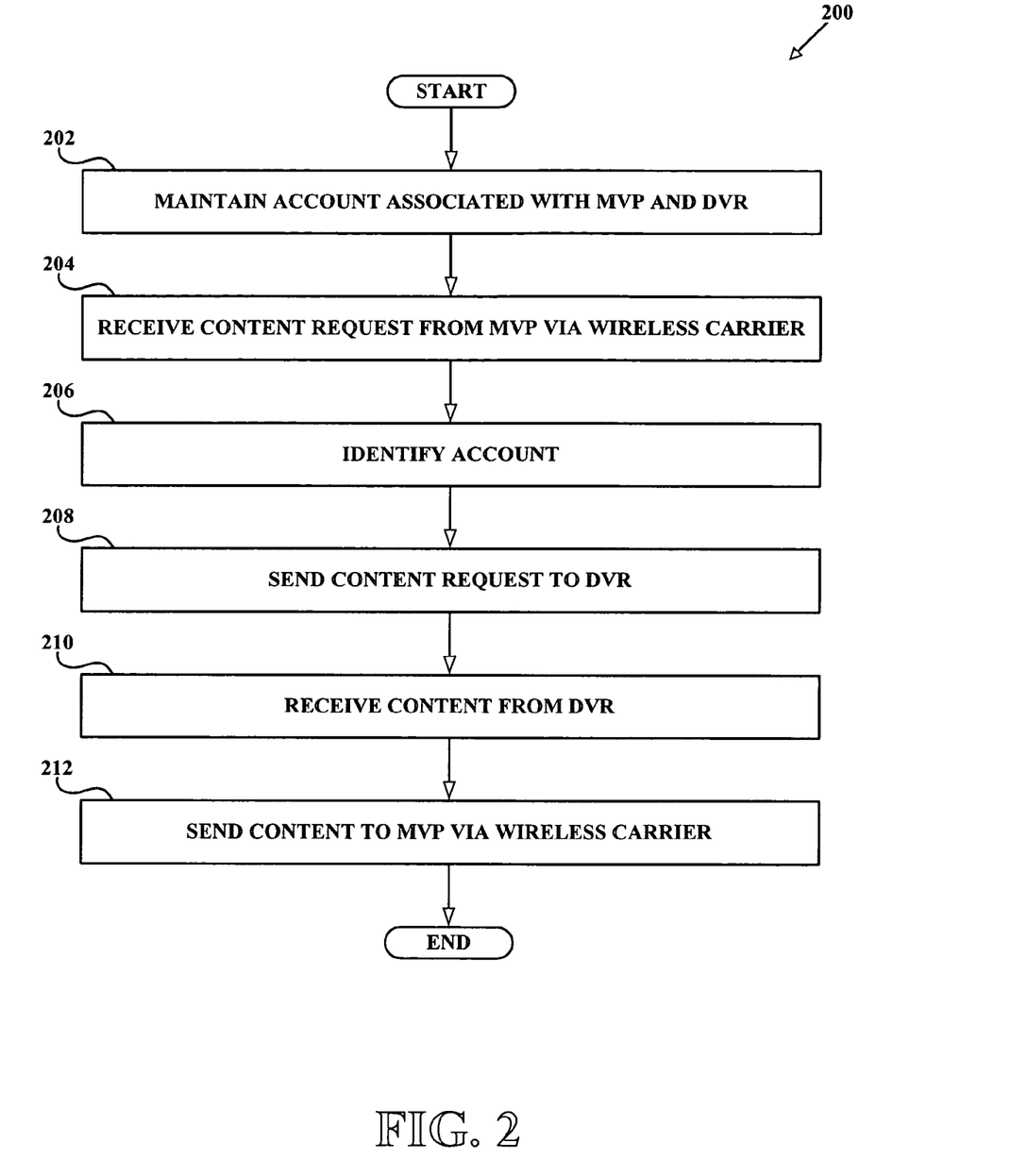
FIG. 2 is a flowchart of an exemplary method that makes use of the communication system of FIG. 1, in accordance with an exemplary embodiment.

FIG. 2 is a flowchart of an exemplary method that makes use of the communication system of FIG. 1, in accordance with an exemplary embodiment. As shown in FIG. 2, a method 200 begins at step 202, when MVP server 110 maintains, for a subscriber, an account that is associated with MVP 102 and with DVR 108. As explained above, MVP 102 is served by wireless carrier 104, and DVR 108 is connected to PDN 106. At step 204, MVP server 110 receives a content request from MVP 102 via wireless carrier 104. This content request identifies content that MVP 102 is requesting to download from DVR 108. This content request further includes an identifier of MVP 102 that was added to the content request by wireless carrier 104 (e.g., by a proxy or gateway) to verify that MVP 102 sent the content request.

At step 206, MVP server 110 uses that identifier of MVP 102 to identify the account referred to in step 202. At step 208, MVP server 110 sends that content request, or a derivative thereof, to DVR 108 over PDN 106. At step 210, MVP server 110 receives the requested content from DVR 108 over PDN 106. At step 212, MVP server 110 sends the requested content to MVP 102 via wireless carrier 104, for receipt and playing of the requested content by MVP 102 for the subscriber. These steps are further explained in the following subsections.

And it should be noted as a general matter that, although method 200 is described herein as being carried out by MVP server 110, this is not required. In other embodiments, method 200 could be carried out by a combination of more than one network server, a gateway, a proxy, a BSC, an RNC, an MSC, a PDSN, some other network element, or perhaps some combination of these. And other possibilities exist as well.

a. Maintaining an Account for a Subscriber

At step 202, MVP server 110 maintains an account for a subscriber. MVP server 110 may store this account in data storage, and the account itself may include any number of fields having any sort of values. This account is associated with MVP 102 and with DVR 108. The association with MVP 102 could take the form of the account including an identifier of MVP 102, such as an MVP ID, as explained above. This MVP ID could include any one or any combination of a MIN, an ESN, an NAI, a SIP address, an IP address, a MAC address, a username, a password, and/or any other type of identifier. Similarly, the association with DVR 108 could take the form of the account including an identifier of DVR 108, such as a DVR ID, as explained above. This DVR ID could include any one or any combination of a serial number, an IP address, a MAC address, a digital certificate, a device identity certificate, and/or any other type of identifier.

Also as stated above, MVP 102 is served by wireless carrier 104, which means that wireless carrier 104 provides data service, and perhaps also voice service, to MVP 102 over an RF air interface using one or more of the wireless-communications protocols mentioned herein, and/or any other suitable protocol. Wireless carrier 104 may maintain a wireless-carrier account for MVP 102 that is distinct from the MVP-server account maintained by MVP server 110. A user of MVP 102 may subscribe to a particular service plan from wireless carrier 104 with a particular billing arrangement.

Also stated above is the fact that DVR 108 is connected to PDN 106. This connectivity may take the form of DVR 108 having a publicly-routable IP address on the Internet. As an alternative, DVR 108 may have a private address on a user's private IP network, behind one or more publicly-addressable entities such as a cable modem, a network access server, etc. In any event, the MVP-server account maintained by MVP server 110 may include DVR 108's current IP address, to facilitate IP communication between MVP server 110 and DVR 108. If DVR 108 has a public address, that public address may be stored in the account. If not, the account may include the public address of a device such as a cable modem, and perhaps a transport-protocol (e.g., TCP or UDP) port number to identify DVR 108.

Thus, prior to, or perhaps to some degree in parallel with the carrying out of step 202, MVP server 110 may carry out the steps of establishing the account for the subscriber, associating MVP 102 with the account, and associating DVR 108 with the account. With respect to establishing the account for the subscriber, this could be done in a number of ways. In some embodiments, wireless carrier 104 could establish the MVP-server account for the subscriber, perhaps as a matter of course after the subscriber acquires MVP 102, or perhaps in response to a request from the subscriber over the phone, in person, or via on online interface.

In some embodiments, the subscriber could log in using a web browser—perhaps using MVP 102 or a personal computer (PC)—to MVP server 110, or to a web server that would in turn interact with MVP server 110, to establish the account. This could occur after the subscriber logs into his or her online account with wireless carrier 104, or perhaps via a separate website. The MVP-server account could be separately billed to the user, or the billing could be handled jointly with the user's wireless-carrier account with wireless carrier 104.

Once the user has established an account with MVP server 110, or perhaps as part of that account-establishment process, or perhaps as an impetus to initiate that process, MVP server 110 may receive a request to associate MVP 102 with an MVP-server account. This request is referred to herein as an "MVP-association request," and may be sent according to any messaging protocol, such as HTTP, SIP, etc.

MVP server 110 may receive the MVP-association request as a result of any of a number of different things taking place. As one example, the user of MVP 102 may select a menu option provided by the operating system or an application running on MVP 102, which may cause MVP 102 to send the MVP-association request to MVP server 110. As another example, MVP 102 may connect to a server or service that is provided by wireless carrier 104, and then select a menu option or link related to MVP association. Other possibilities include the subscriber logging into MVP server 110 via a web browser on a PC, as described above.

The MVP-association request may include any sort of data to identify the subscriber and/or MVP 102, such as an e-mail address, a username, a password, an NAI, a MIN, an ESN, etc. If an MVP-server account has not yet been set up for this subscriber, then an account could be established at that time. If an MVP-server account had previously been established, then MVP server 110 may use some or all of this identifying data to identify the correct account. If MVP server 110 does not yet have the MIN (i.e., directory telephone number) of MVP 102, then MVP server 110 may request the MIN from the subscriber, perhaps via HTTP messaging.

Next, responsive to receiving the MVP-association request, MVP server 110 may send a reply message to MVP 102. That reply message is referred to herein as an "MVP-association reply," and may be sent according to any messaging protocol, such as HTTP, WAP, MMS, SIP, etc. The MVP-association reply may include a link to MVP server 110. Upon receiving the MVP-association reply, MVP 102 may, likely in response to the user clicking on the provided link, use that link to contact MVP server 110, perhaps by sending to MVP server 110 a confirmation message, referred to herein as an "MVP-association confirmation." Thus, as a result of the user invoking the provided link, MVP 102 may send the MVP-association confirmation via a wireless packet-data connection to wireless carrier 104.

Wireless carrier 104 may receive the MVP-association confirmation, and add to that message an identifier that uniquely identifies MVP 102, i.e., an MVP ID as described above. As stated, wireless carrier 104 is in a good position to add data that uniquely identifies MVP 102 to verify that MVP 102 actually sent the MVP-association confirmation. This should prevent spoofing of MVP server 110, which could result from MVPs adding their own identifying data to the MVP-association confirmation. This way, MVP server 110 can have a trusted, perhaps encrypted and/or encoded, relationship with wireless carrier 104 (e.g., with one or more gateways, servers, and/or proxies, etc. operated by wireless carrier 104). In response to receiving the MVP-association confirmation that has been properly authenticated by wireless carrier 104, MVP server 110 associates MVP 102 with the subscriber's account.

In addition to establishing the MVP-server account for the subscriber and associating MVP 102 with that account, MVP server 110 also associates DVR 108 with that same account. As with the association of MVP 102 with the account, the association of DVR 108 with the account can be conducted in any number of ways. Essentially, MVP server 110 may receive a request to associate DVR 108 with the account, and that request or some other message may include data that both indicates which MVP-server account is relevant, as well as data identifying DVR 108, i.e., a DVR ID as described above, which could include any one or any combination of a serial number, IP address, MAC address, digital certificate, device identity certificate, etc. And no matter what form the DVR ID takes, MVP server 110 will preferably maintain a current IP address (and perhaps a transport-protocol port number) for use in communicating with DVR 108.

b. Receive Content Request from MVP Via Wireless Carrier

At step 204, MVP server 110 receives a content request from MVP 102 via wireless carrier 104. This content request identifies requested content that MVP 102 wishes to download from DVR 108. Note that the user's MVP-server account may include reference to one or more DVRs. If there is just one DVR associated with the account, then the content request from MVP 102 may or may not include a name or other identifier for DVR 108. If more than one DVR is associated with the account, the content request would preferably specify from which DVR the content is requested, though this is not absolutely necessary, as a default DVR could be used, as could a default order of checking multiple DVRs, or even a default policy of checking all associated DVRs for the specified content. In some embodiments, the content listings that MVP server periodically provides to MVP 102 may indicate the source DVR for each content item. When MVP 102 requests content, MVP server 110 may then identify the source DVR.

Regardless, as stated, the content request will identify the requested content that MVP 102 wishes to download from DVR 108. This content could be referred to by a content identifier such as a number or name, or perhaps by television show and episode name, by song title, and/or by any other identifier. The content itself could be any type of content, with a few examples including visual content, video content, audio content, textual content, and/or any combination thereof. Content such as television shows and movies may be likely candidates.

Furthermore, the content request received by MVP server 110 from MVP 102 via wireless carrier 104 will include an identifier of MVP 102 that was added to the content request by wireless carrier 104. Again, this MVP ID could be a MIN, ESN, NAI, SIP address, IP address, MAC address, username, password, some other identifier, or some combination thereof, and could be encrypted according to a decryption key that is shared between the wireless carrier and MVP server 110. It is this added MVP ID that verifies for MVP server 110 that MVP 102 sent the content request. Thus, the content request passes across a packet-data connection from MVP 102 to wireless carrier 104, wireless carrier 104 then adds the MVP ID, and wireless carrier 104 then sends the augmented content request to MVP server 110 over PDN 106.

Note that MVP 102 may originally format the content request that it sends to MVP server 110 via wireless carrier 104 by referencing a listing of the content currently available for download to MVP 102 from DVR 108. In particular, in accordance with the present invention, a mechanism may be in place to provide a listing of available content to MVP 102, at the request of the subscriber. DVR 108 may be configured, periodically or perhaps in response to changes in its current catalog of content, to send catalog updates to MVP server 110 over PDN 106. Each of those catalog updates may include a listing of what content is currently available for download to MVP 102. MVP server 110 may responsively store those listings in connection with the subscriber's account and, upon receiving requests from MVP 102 for a most-recent listing, provide the most-recent listing to MVP 102, for presentation to the subscriber.

c. Using the Identifier of the MVP to Identify the Account

At step 206, MVP server 110 uses the identifier of MVP 102 that was included in the content request—and specifically that was added to the content request by wireless carrier 104—to identify the correct subscriber account. In particular, MVP server 110 may parse the content request to extract the identifier of MVP 102, and decrypt and/or decode that identifier if necessary. MVP server 110 may then search its MVP-server accounts for one having MVP-identifying data that matches the MVP-identifying data from the content request. This account-identification step will, by implication, identify a set of one or more DVRs from which MVP 102 may be requesting download of content. If the content request also includes a DVR identifier, MVP server 110 may use that DVR identifier to identify a particular DVR such as DVR 108.

d. Send Content Request to DVR

At step 208, MVP server 110 sends a content request to DVR 108 over PDN 106. The content request sent in this step could be the exact same content request received in step 204, or it could be a derivative thereof, or a content request generated by MVP server 110 to request the same content as that requested by the content request of step 204. In general, there could be overlap in the messaging protocols and messages exchanged between MVP 102 and MVP server 110 with the protocols and messages exchanged between MVP server 110 and DVR 108, but this is not necessary. In any event, the content request sent in connection with step 208 will identify the requested content to DVR 108.

e. Receive Requested Content from DVR

At step 210, MVP server 110 receives the requested content from DVR 108 over PDN 106. The requested content sent from DVR 108 to MVP server 110 over PDN 106 in step 210 could be sent according to any protocol, and could be encoded and/or encrypted according to any encoding and encrypting methods. For its part, DVR 108 receives the content request sent in step 208, prepares the requested content for transmission to MVP server 110, and then sends the content to MVP server 110 over PDN 106. As stated herein, more than one DVR could be associated with the subscriber's MVP-server account. As such, as part of carrying out step 210, the requested content could be received from DVR 108 and one or more additional DVRs.

f. Send Requested Content to MVP via Wireless Carrier

At step 212, MVP server 110 sends the requested content to MVP 102 via PDN 106 and wireless carrier 104, for receipt and playing by MVP 102 for the subscriber. Note that MVP server 110 may encrypt the requested content according to a particular decryption key, and then send the encrypted content to MVP 102. MVP 102 may then use the decryption key to decrypt the requested content upon receipt. This decryption key may be unique to MVP 102. In other embodiments, the decryption of the content could be performed by an entity such as a gateway or proxy maintained by wireless carrier 104, which would then send the content to MVP 102. Note that, even in these embodiments, the content would still be encrypted for MVP 102's use only.

Note that MVP 102 could be provisioned with the decryption key by wireless carrier 104, perhaps at a service center or over the air. As another possibility, MVP server 110 could send this decryption key to MVP 102. For example, MVP server 110 may send the decryption key to MVP 102 (or to a suitable wireless-carrier-104 entity) when the subscriber establishes the MVP-server account. As another possibility, MVP server 110 may send the decryption key upon associating MVP 102 with that account. In either of these cases, MVP server 110 and MVP 102 (or the wireless-carrier-104 network entity) may use that same decryption key for all content transfers from DVR 108.

In another embodiment, MVP server 110 could send the decryption key to MVP 102 (or the wireless-carrier-104 network entity) in connection with a particular content transfer. In that case, the key would be unique to both MVP 102 and to the content. In another embodiment, MVP 102 may send a request to MVP server 110 or to some other server maintained by wireless carrier 104 or by a third party each time MVP 102 wishes to play the requested content. Thus, the decryption key could be unique to a single instance (or several instances, or period of elapsed time (such as 24 hours or 30 days)). These decryption-key requests could then be translated into billing of the subscriber on a per-download, per-play, per-time-period, or per-some-other-metric basis. The user could be billed as well or instead based on the amount of data transferred. Note as well that the user could be charged fees that could then be used to pay content providers, to facilitate payment for copyrighted or otherwise-protected content.

Whether or not MVP server 110 encrypts the requested content, MVP server 110 may transcode the requested content for transmission to MVP 102. Thus, upon receipt of the content request in step 204, upon receipt of the content in step 210, or perhaps in connection with some other event, MVP server 110 may locally or remotely access data that indicates the capabilities and/or preferences of MVP 102. For example, this data may indicate which codec(s) MVP 102 is capable of processing and/or prefers to process. MVP server 110 may then transcode the requested content in accordance with the device-capabilities data. MVP server 110 may then send the transcoded content to MVP 102, such that MVP 102 will be able to handle—or able to handle more easily—the receipt and playing of the content.

4. Conclusion

Various exemplary embodiments have been described above. Those skilled in the art will understand, however, that changes and modifications may be made to those examples without departing from the scope of the claims.

What is claimed is:

1. A method comprising:
    maintaining an account for a subscriber, wherein the account is associated with a mobile video player (MVP) and a digital video recorder (DVR), wherein the MVP is served by a wireless carrier, and wherein the DVR is connected to a packet-data network;
    receiving a first content request from the MVP via the wireless carrier, wherein the first content request identifies requested content and includes an identifier of the MVP, and wherein the identifier of the MVP was added to the first content request by the wireless carrier to verify that the MVP sent the first content request;
    using the identifier of the MVP to identify the account;
    sending a second content request to the DVR over the packet-data network, wherein the second content request identifies the requested content;
    receiving the requested content from the DVR over the packet-data network; and
    sending the requested content to the MVP via the wireless carrier, for receipt and playing of the requested content by the MVP for the subscriber.

2. The method of claim 1, carried out by one or more network servers.

3. The method of claim 1, wherein the MVP comprises at least one device selected from the group consisting of a cell phone, a personal digital assistant, and a computer.

4. The method of claim 1, wherein the requested content comprises at least one of visual content, video content, audio content, and textual content.

5. The method of claim 1, wherein the identifier of the MVP comprises at least one of a Mobile Identification Number, an Electronic Serial Number, a Network Access Identifier, a Session Initiation Protocol address, an Internet Protocol address, a Media Access Control address, a username, and a password.

6. The method of claim 1, wherein:
    receiving the first content request from the MVP via the wireless carrier comprises receiving the first content request from the MVP over a communication path that comprises the wireless carrier and the packet-data network; and
    sending the requested content to the MVP via the wireless carrier comprises sending the requested content to the MVP over the communication path.

7. The method of claim 1, wherein the first content request further comprises an identifier of the DVR, the method further comprising using the identifier of the DVR to identify the DVR.

8. The method of claim 7, wherein the identifier of the DVR comprises at least one of a serial number, an Internet Protocol address, a Media Access Control address, a digital certificate, and a device identity certificate.

9. The method of claim 1, further comprising:
    receiving catalog updates from the DVR, wherein each catalog update comprises a listing of what content is currently available for download to the MVP;
    storing each listing in response to receiving each catalog update;
    receiving requests from the MVP for a most-recent listing; and
    providing the most-recent listing to the MVP in response to each request, for presentation to the subscriber.

10. The method of claim 1, further comprising:
    sending a decryption key to a decrypting entity, wherein the decrypting entity is selected from the group consisting of the MVP and a wireless-carrier-network entity, and wherein the decryption key is unique to the MVP; and
    encrypting the requested content according to the decryption key, the method further comprising the decrypting entity using the decryption key to decrypt the requested content.

11. The method of claim 10, wherein sending the decryption key is carried out in response to receiving a decryption-key request, and wherein the requested content is decrypted on a per-use basis.

12. The method of claim 1, further comprising:
    accessing device-capabilities data indicating the capabilities of the MVP; and
    producing transcoded requested content by transcoding the requested content based at least in part on the device-capabilities data, wherein sending the requested content to the MVP comprises sending the transcoded requested content to the MVP.

13. The method of claim 1, further comprising:
    establishing the account for the subscriber;
    associating the MVP with the account; and
    associating the DVR with the account.

14. The method of claim 13, further comprising:
    receiving an MVP-association request to associate the MVP with the account;
    responsive to receiving the MVP-association request, sending an MVP-association reply to the MVP, the MVP-association reply comprising a link to an MVP server; and
    receiving an MVP-association confirmation from the MVP, wherein the MVP-association confirmation is associated with the MVP using the link to contact the MVP server, wherein the MVP-association confirmation comprises the identifier of the MVP, wherein the identifier of the MVP was added to the MVP-association confirmation by the wireless carrier to verify that the MVP sent the MVP-association confirmation, and wherein associating the MVP with the account is carried out in response to receiving the MVP-association confirmation.

15. The method of claim 14, wherein the MVP-association reply comprises at least one of a registration message, a HyperText Transfer Protocol message, a Wireless Application Protocol message, a Multimedia Message Service message, and a Session Initiation Protocol message.

16. The method of claim 1, further comprising:
    associating at least one additional DVR with the account; and
    receiving at least part of the requested content from an additional DVR.

17. The method of claim 1, further comprising billing the subscriber at least one of a fee for each instance of DVR-to-MVP content transfer, a fee based on a quantity of transferred data, and a fee for payment to at least one content provider.

18. A mobile-video-player (MVP) server comprising:
    a communication interface;
    a processor; and
    data storage having stored therein instructions executable by the processor to:
        maintain an account for a subscriber, wherein the account is associated with a mobile video player (MVP) and a digital video recorder (DVR), wherein the MVP is served by a wireless carrier, and wherein the DVR is connected to a packet-data network;

receive a first content request from the MVP via the wireless carrier, wherein the first content request identifies requested content and includes an identifier of the MVP, and wherein the identifier of the MVP was added to the first content request by the wireless carrier to verify that the MVP sent the first content request;

use the identifier of the MVP to identify the account;

send a second content request to the DVR over the packet-data network, wherein the second content request identifies the requested content;

receive the requested content from the DVR over the packet-data network; and send the requested content to the MVP via the wireless carrier, for receipt and playing of the requested content by the MVP for the subscriber.

19. The MVP server of claim 18, wherein the data storage further comprises instructions executable by the processor to:

receive catalog updates from the DVR, wherein each catalog update comprises a listing of what content is currently available for download to the MVP;

store each listing in response to receiving each catalog update;

receive requests from the MVP for a most-recent listing; and provide the most-recent listing to the MVP in response to each request, for presentation to the subscriber.

20. The MVP server of claim 18, wherein the data storage further comprises instructions executable by the processor to:

receive an MVP-association request to associate the MVP with the account;

responsive to receiving the MVP-association request, send an MVP-association reply to the MVP, the MVP-association reply comprising a link to the MVP server; and receive an MVP-association confirmation from the MVP, wherein the MVP-association confirmation is associated with the MVP using the link to contact the MVP server, wherein the MVP-association confirmation comprises the identifier of the MVP, wherein the identifier of the MVP was added to the MVP-association confirmation by the wireless carrier to verify that the MVP sent the MVP-association confirmation, and wherein associating the MVP with the account is carried out in response to receiving the MVP-association confirmation.

\* \* \* \* \*